March 21, 1933.  C. L. EKSERGIAN  1,902,223
METHOD OF MAKING HUBS
Filed June 4, 1929

INVENTOR.
CAROLUS L. EKSERGIAN
BY
ATTORNEY.

Patented Mar. 21, 1933

1,902,223

UNITED STATES PATENT OFFICE

CAROLUS L. EKSERGIAN, OF DETROIT, MICHIGAN, ASSIGNOR TO BUDD WHEEL COMPANY, OF PHILADELPHIA, PENNSYLVANIA, A CORPORATION OF PENNSYLVANIA

METHOD OF MAKING HUBS

Application filed June 4, 1929. Serial No. 368,349.

The object of the present invention is an outstanding object in this art, the cheapening of the manufacture of hubs for automotive vehicles. Savings in material and labor are constantly sought. This invention makes yet greater strides toward the goal of utmost simplicity and least labor possible.

The idea is to utilize tubing for the barrel of the hub and flat stock for the flange, to axially compress the tube to form an annularly external shoulder, either by upsetting or by axial compression to the extent of external wall collapse, preferably by the latter, and thereafter butt welding a flanged ring to the shoulder so formed.

In the accompanying drawing.

Figure 1:
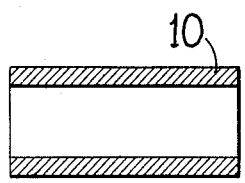
Figure 1 shows a section of tubing in axial section before the shoulder is formed.
Figure 2:
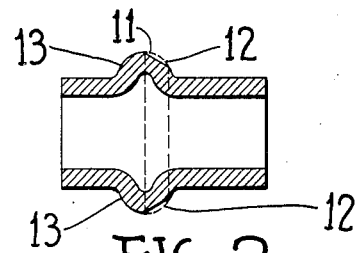
Figure 2 is a similar view after the shoulder is formed.

A section of tubing 10 is cut from any long length of tubing, or it may be formed in short lengths corresponding to the length of the section desired to constitute the barrel and shoulder. This section of tubing 10 is preferably subjected to axial compression to externally collapse its walls slightly, sufficiently to form a bead 11, the sides of which constitute shoulders 12 and 13. The adjoining walls of the tubular section 10 may be confined during the collapsing process. The shoulder may be formed in yet other ways, but I prefer the external collapse of the walls to a greater or less extent, preferably the lesser extent represented by the protrusion of the bead 11 rather than the protrusion of the double wall radial flange as has been done in certain other processes. Either the shoulder 12 or 13, the shoulder 12 as shown, may be cleaned by machining or otherwise to facilitate the flash welding of the flange ring thereto.

Figure 3:
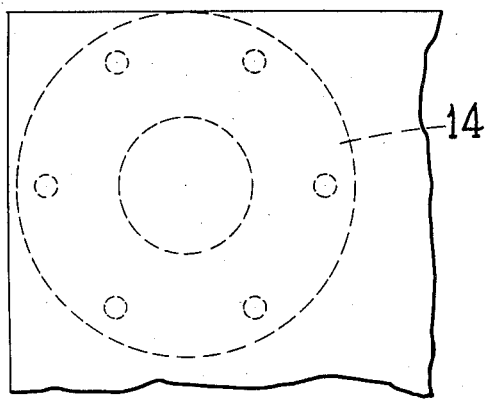
Figure 3 is a plan view of flat stock from which the flanged ring is formed.
Figure 4:
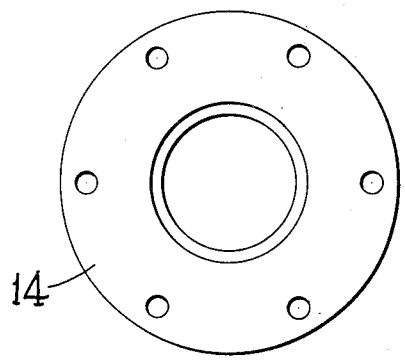
Figure 4 is an elevation of the flanged ring.

The flange ring is manufactured from the plate stock 14 by a die stamping operation or otherwise. It is designated 14 in Figs. 3 and 4. Its inside diameter is appropriately finished to the diameter of the barrel and the dimensions of the shoulder 12 upon which it is to be seated. Preferably it is beveled by a machine or other process to be complemental to the inclination of the shoulder 12. The shoulder 12 on the bead, as formed by external wall collapse, is naturally inclined. The complemental bevel 12a of the flanged ring 14 enables the ring to be flash welded to the shoulder under axial relative movement of tube 10 and flanged ring 14.

Figure 5:
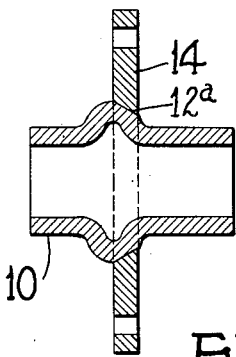
Figure 5 is an axial section of the completed product.
Figure 6:
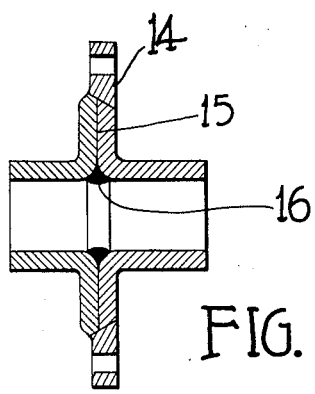
Figure 6 is an axial section of a modification.

The parts so formed are placed in suitable welding machines and flash welded together to constitute the completed hub of Fig. 5.

This structure is clearly of the very simplest. There is substantially no waste of material. The amount of machining to finish the product is a veritable mnimum since the tube diameters are properly chosen with respect to the final dimensions of the barrel. Of course, the tube may be formed to varying diameters as between its opposite ends to constitute other hub conditions. So also, the dimensions of the flat stock from which the flanged ring is formed are chosen with respect to the ultimate radius and thickness of the flanged ring so that there is a minimum of machine work on the ring. The process of integral joinder by flash welding is recognizedly highly economical and rapid. There is naught in the process to impair the first quality of material chosen nor the final perfection of the little machine work which need be done on the hub.

The height of the bead 11 and the proximity of the surfaces of the flash weld to the body of the hub barrel should be so regulated as to preclude the formation of an arc between the flange 14 and the barrel portion of the hub or the carrying of the welding process to the barrel of the hub. This merely means that the distance between the inner periphery of flange 14 and the periphery of the barrel be sufficiently great to preclude these things. Height of the bead, of course, may be made anything desired and it may be made such as to constitute the bead an actual rudimentary flange of appreciable height. In each case the burning away of the metal may be such as to reach the inner walls 15 whereupon the collapsed walls become joined together by the flanged ring 14 as welded thereto. In fact, the preparatory machining operation may be carried to such a depth as to separate these walls. If so, it may be found preferable to preliminarily arc weld the walls together on the inside as shown at 16. Although I have described the parts of my hub as being flash welded together, it will be obvious that the flange ring may be secured to the opposite portion 12 by other suitable types of butt welding or in any other convenient manner.

What I claim as new and useful and desire to protect by Letters Patent is:

The method of forming hubs which consists in subjecting a tube to axial pressure to slightly externally collapse its walls intermediate its ends and thereby form an annular external shoulder, machining a portion of said shoulder, complementally machining the interior portion of a ring adapted to constitute the flange of the finished hub, and butt welding said complementally machined portions together.

In testimony whereof I hereunto affix my signature.

CAROLUS L. EKSERGIAN.